United States Patent [19]

Ayala et al.

[11] Patent Number: 5,401,475
[45] Date of Patent: Mar. 28, 1995

[54] PROCESS AND APPARATUS FOR GENERATING ELEMENTAL SULFUR AND RE-USABLE METAL OXIDE FROM SPENT METAL SULFIDE SORBENTS

[75] Inventors: Raul E. Ayala, Clifton Park, N.Y.; Eli Gal, Lititz, Pa.

[73] Assignee: G.E. Environmental Services, Inc., Lebanon, Pa.

[21] Appl. No.: 106,616

[22] Filed: Aug. 16, 1993

Related U.S. Application Data

[63] Continuation of Ser. No. 71,620, Jun. 4, 1993, which is a continuation of Ser. No. 726,596, Jul. 8, 1991, abandoned.

[51] Int. Cl.$^6$ .......................... B01D 53/34; B01J 8/12; B01J 20/34; B01J 38/28
[52] U.S. Cl. .................................. 422/190; 422/172; 422/178; 422/194; 422/216; 422/219; 422/223; 423/244.01; 502/46; 502/517
[58] Field of Search ............... 422/142, 144, 145, 171, 422/172, 187, 190, 193, 194, 216, 219, 223, 177, 178; 423/230, 244.01, 571, 577; 502/43–46, 517

[56] References Cited

U.S. PATENT DOCUMENTS

| | | | |
|---|---|---|---|
| 587,068 | 7/1897 | Stickney | 423/572 |
| 1,626,664 | 5/1927 | Brady | 423/231 |
| 1,816,533 | 7/1931 | Huff et al. | 423/231 |
| 2,259,409 | 10/1941 | Wenzel et al. | 423/230 |
| 2,370,234 | 2/1945 | Degnen et al. | 422/190 |
| 2,551,905 | 5/1951 | Robinson | 423/230 |

(List continued on next page.)

FOREIGN PATENT DOCUMENTS

| | | |
|---|---|---|
| 157940 | 4/1952 | Australia . |
| 504089 | 12/1951 | Belgium . |
| 1052761 | 4/1979 | Canada . |
| 0122838 | 10/1984 | European Pat. Off. . |
| 2274335 | 1/1976 | France . |
| 3436598 | 4/1985 | Germany . |
| 1471794 | 4/1977 | United Kingdom . |
| 1550354 | 8/1979 | United Kingdom . |

OTHER PUBLICATIONS

Dorchak, T. P. et al. "Direct Sulfur Recovery Process For Elemental Sulfur Recovery From Gas", American Chemical Society Division of Fuel Chemistry Preprints, vol. 35 #1, Papers presented 199th ACS Meeting (1990), pp. 207–216.

Wen, C. Y. et al., "Kinetic Studies on the Reactions Involved in the Hot Gas Desulfurization Using a Re- (List continued on next page.)

*Primary Examiner*—Robert J. Warden
*Assistant Examiner*—L. M. Crawford
*Attorney, Agent, or Firm*—Finnegan, Henderson

[57] ABSTRACT

A process and apparatus for generating elemental sulfur and re-usable metal oxide from spent metal-sulfur compound. Spent metal-sulfur compound is regenerated to re-usable metal oxide by moving a bed of spent metal-sulfur compound progressively through a single regeneration vessel having a first and second regeneration stage and a third cooling and purging stage. The regeneration is carried out and elemental sulfur is generated in the first stage by introducing a first gas of sulfur dioxide which contains oxygen at a concentration less than the stoichiometric amount required for complete oxidation of the spent metal-sulfur compound. A second gas containing sulfur dioxide and excess oxygen at a concentration sufficient for complete oxidation of the partially spent metal-sulfur compound, is introduced into the second regeneration stage. Gaseous sulfur formed in the first regeneration stage is removed prior to introducing the second gas into the second regeneration stage. An oxygen-containing gas is introduced into the third cooling and purging stage. Except for the gaseous sulfur removed from the first stage, the combined gases derived from the regeneration stages which are generally rich in sulfur dioxide and lean in oxygen, are removed from the regenerator as an off-gas and recycled as the first and second gas into the regenerator. Oxygen concentration is controlled by adding air, oxygen-enriched air or pure oxygen to the recycled off-gas.

14 Claims, 2 Drawing Sheets

U.S. PATENT DOCUMENTS

| | | |
|---|---|---|
| 2,682,444 | 6/1954 | Phillipps ................................. 423/231 |
| 2,983,573 | 5/1961 | Moore et al. ........................... 423/231 |
| 3,061,421 | 10/1962 | Landau et al. ........................... 48/197 |
| 4,008,174 | 2/1977 | Jacobson et al. ........................ 502/39 |
| 4,088,736 | 5/1978 | Courty et al. .............. 423/244.07 X |
| 4,089,809 | 5/1978 | Farrior, Jr. ...................... 423/231 X |
| 4,138,473 | 2/1979 | Gieck ................................. 423/541.1 |
| 4,251,495 | 2/1981 | Deschamps et al. ............ 502/517 X |
| 4,273,749 | 6/1981 | Kimura et al. ........................ 423/231 |
| 4,310,497 | 1/1982 | Deschamps et al. ............. 423/231 X |
| 4,363,790 | 12/1982 | Anderson et al. .................... 423/230 |
| 4,366,131 | 12/1982 | Fox ........................................ 423/231 |
| 4,424,192 | 1/1984 | Lomas et al. ................... 422/144 X |
| 4,435,371 | 3/1984 | Frech et al. ........................ 423/231 X |
| 4,442,078 | 4/1984 | Jalan et al. ........................ 423/231 X |
| 4,462,977 | 7/1984 | Reed ................................. 422/190 X |
| 4,478,800 | 10/1984 | van der Wal et al. .......... 423/231 X |
| 4,489,047 | 12/1984 | de Jong et al. ................. 502/517 X |
| 4,622,210 | 11/1986 | Hirschberg et al. ............. 422/190 X |
| 4,687,637 | 8/1987 | Greenwood ........................... 422/62 |
| 4,797,268 | 1/1989 | McGovern et al. ............. 422/190 X |
| 4,798,716 | 1/1989 | Palm ................................... 422/62 X |
| 4,857,285 | 8/1989 | Gal ....................................... 423/230 |
| 4,994,257 | 2/1991 | Suchiro et al. ....................... 423/577 |
| 5,026,528 | 6/1991 | Gal ....................................... 422/111 |
| 5,152,970 | 10/1992 | Van der Wal et al. ............. 423/230 |
| 5,271,907 | 12/1993 | Copeland ............................ 422/178 |

OTHER PUBLICATIONS generable Iron Oxide Sorbent–II". Chemical Engineering Science, vol. 36, pp. 1287–1294 (1981).

Strickland et al., "The Effect of Temperature and Pressure on the Regeneration of Zinc Ferrite Desulfurization Sorbents" 1985 Program Schedule, pp. 190–212, PTPA No. 5–920.

Flytzani–Stephanopoulas et al., "Detailed Studies of Novel Regenerable Sorbents for High–Temperature Coal–Gas Desulfurization", 1986 Program Schedule, pp. 257–266, Contract No. DE–FC21–85MC22193.

Harrison et al., "Structural Changes in Metal Oxide Hot Coal Gas Desulfurization Sorbents", 1986 Program Schedule, pp. 221–230. Contract No. DE–RP–2-1–84MC21166, from Proceedings of the Sixth Annual Contractors Meeting . . . Jun. 1986.

"Sulfur (S) and its Compounds" Chemical Encyclopedia, 9th edition, pp. 938–940, 944 and 945.

PROCESS AND APPARATUS FOR GENERATING ELEMENTAL SULFUR AND RE-USABLE METAL OXIDE FROM SPENT METAL SULFIDE SORBENTS

This is a continuation of application Ser. No. 08/071,620, filed Jun. 4, 1993, which is a continuation of application Ser. No. 07/726,596, filed Jul. 8, 1991, abandoned

BACKGROUND OF THE INVENTION

This invention relates to the regeneration of spent metal-sulfur compounds, and more particularly, to a process and apparatus for simultaneously generating and recovering elemental sulfur and re-usable metal oxide from spent metal sulfide sorbents.

A method and system for removal of sulfur compounds from gases and for regenerating spent sorbents is described in U.S. Pat. No. 4,857,285 which is incorporated by reference herein in its entirety. In U.S. Pat. No. 4,857,285, sulfur compounds in a hot gas moving in a direction which is countercurrent to the direction of movement of a movable bed of metal oxide, react with the metal oxide to form metal sulfide. The metal sulfide is regenerated to re-usable metal oxide in a moving bed regenerator, and the regeneration is carried out with an oxygen-containing gas in which regenerator off-gas serves as a diluent to control oxygen concentration. In the regenerator of U.S. Pat. No. 4,857,285, spent metal sulfide moves progressively through a single regeneration vessel having first, second and third regeneration stages, and in the first and second regeneration stages, first and second oxygen and sulfur dioxide-containing gases are moved, respectively, in a direction which is co-current with the direction of movement of the movable bed of spent metal sulfide. In the third regeneration stage, an oxygen-containing gas moves in a direction which is countercurrent to the direction of movement of the movable bed of metal sulfide. The combined gases which are rich in sulfur dioxide and lean in oxygen, derived from the first, second and third regeneration stages are removed from the regenerator as off-gas and used as diluent with air, oxygen-enriched air or pure oxygen to provide the appropriate oxygen concentration in the oxygen-containing gases introduced into the first and second regeneration stages.

In the process and apparatus disclosed in U.S. Pat. No. 4,857,285, regeneration of the sorbent material produces sulfur dioxide. The sulfur dioxide so recovered eventually has to be converted into an environmentally safe disposable product or into a usable chemical by-product. Frequently, these conversions require additional plant operations which result in added capital and operating costs to the plant.

In other desulfurization processes, spent sorbent materials are regenerated to produce elemental sulfur. For example, where iron sulfide is the spent sorbent, it is oxidized by controlled amounts of oxygen to produce elemental sulfur and ferric oxide according to equation (I):

$$4\,FeS + 3O_2 \rightarrow 2\,Fe_2O_3 + 4S \tag{I}$$

Excess oxygen would further oxidize sulfur to sulfur dioxide. Elemental sulfur can be sold directly as recovered and is an environmentally safe product as compared with sulfur dioxide. Accordingly, it can be seen that a process for regenerating spent sorbents or an apparatus for regenerating spent sorbents which produces elemental sulfur instead of sulfur dioxide, is advantageous.

The desirability of higher elemental sulfur yield from the regeneration of sulfided or spent sorbents with oxygen-containing gases is discussed in U.S. Pat. No. 4,363,790, which is incorporated by reference herein in its entirety. In U.S. Pat. No. 4,363,790, sulfided compounds are formed from oxides of chromium, a combination of oxides of zinc and chromium, a combination of oxides of zinc and aluminum and mixtures thereof and are regenerated by contacting them with an oxygen-containing gas stream at temperatures of about 760° C. (1400° F.) to 1315° C. (2400° F.). Sulfur removed in the regeneration is in the form of elemental sulfur. In U.S. Pat. No. 4,363,790, it is indicated that the elemental sulfur may be increased by recycle of the regenerator off-gas and that the oxygen-containing gas used for regeneration may be any gas containing significant amounts of oxygen.

In view of the foregoing, it can be seen that it is desirable to provide improved processes and improved apparatus for regenerating sulfided or spent sorbents which result in a sulfur-containing off-gas with sulfur compound distribution favorable for recovery as elemental sulfur and to provide a process for the regeneration of spent metal-sulfur compounds which will produce elemental sulfur in the regenerator itself and to provide an apparatus for the regeneration of spent metal-sulfur sorbents which will produce elemental sulfur in the regenerator itself. It can also be seen that it is advantageous to provide such improvements in processes and apparatus already available and known in the art.

SUMMARY OF THE INVENTION

In order to achieve the foregoing, there is provided a process and apparatus wherein metal-sulfur compounds (metal sulfides) are oxidized to generate elemental sulfur. The oxidation is achieved in an environment rich in sulfur dioxide and lean in oxygen wherein the reaction can be described as follows:

$$M_xS_y + SO_2 + O_2 \rightarrow M_xO_z + SO_2 + S \tag{II}$$

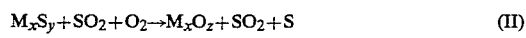

where M is a metal conventionally used in sorbents for removal of sulfur compounds from gases in the form of a metal oxide or the equivalent thereof; x is less than 4; y is less than 3 and z is less than 4. The reaction shown above is not chemically balanced and may kinetically go through intermediate by-products. In accordance with the present invention, low oxygen concentration and high sulfur dioxide concentration improve the yield of elemental sulfur production.

Generally, the process and apparatus of the present invention for generating elemental sulfur and re-usable metal oxide from spent metal-sulfur compound is an improvement of the process described and claimed in U.S. Pat. No. 4,857,285.

In the process of the present invention, elemental sulfur and re-usable metal oxide are generated from spent metal-sulfur compound by (a) moving a packed, non-fluidized bed of spent metal-sulfur compound progressively through a single regeneration vessel having a first regeneration stage, a second regeneration stage and a third cooling and purging stage; (b) introducing a first gas into the first regeneration stage and moving the first gas in the packed, non-fluidized bed in the first regeneration stage in a direction which is co-current with the direction of movement of the spent metal sulfur compound to form, in an exothermic reaction, gaseous sulfur and partially spent metal-sulfur compound, the first gas comprising sulfur dioxide and oxygen at a concentration less than the stoichiometric amount required for complete oxidation of the spent metal sulfur-compound, thereby promoting the formation of gaseous sulfur; (c) introducing a second gas into the second regeneration stage and moving the second gas in the packed non-fluidized bed in the second regeneration stage in a direction which is co-current with the direction of movement of the partially spent metal-sulfur compound to form, in an exothermic reaction, gaseous sulfur compound and reusable metal oxide, the second gas comprising sulfur dioxide and oxygen at a concentration sufficient for complete oxidation of the partially spent metal-sulfur compound; (d) removing gaseous sulfur formed in the first regeneration stage prior to introducing the second gas into the second regeneration stage; (e) introducing gas containing oxygen and the reusable metal oxide into the third cooling and purging stage and passing the oxygen-containing gas in the packed, non-fluidized bed in a direction which is countercurrent to the direction of movement of the reusable metal oxide whereby the reusable metal oxide is cooled and purged of gaseous sulfur compound, and residual spent metal sulfur compound is completely converted to reusable metal oxide; and (f) removing the reusable metal oxide and the gaseous sulfur compound from the regenerator.

In the improved apparatus of the present invention, there is (a) a regenerator having means defining a first regeneration stage, a second regeneration stage and a third stage for cooling and purging in a single vessel; (b) means for feeding the spent metal-sulfur compound to the first regeneration stage of the regenerator; (c) means for moving the bed of spent metal-sulfur compound from the first regeneration stage to the second regeneration stage and thereafter to the third stage for cooling and purging; (d) a first gas inlet means for adding a first gas comprising sulfur dioxide and oxygen into the first regeneration stage to contact the spent metal-sulfur compound and to regenerate at least part of the spent metal-sulfur compound, the first gas being added to the first regeneration stage to provide a co-current flow of gas and spent metal-sulfur compound; (e) means to control the amount of oxygen in the first gas contacting the spent metal-sulfur compound and thereby generate gaseous sulfur and partially spent metal-sulfur compound in the reaction between the first gas and the spent metal-sulfur compound in the first regeneration stage, the amount of oxygen in the first gas being less than the stoichiometric amount required for complete oxidation of the spent metal-sulfur compound; (f) a second gas inlet means for adding a second gas to the second regeneration stage to contact the partially spent metal-sulfur compound and thereby form a bed of reusable metal oxide, the second gas being added to the second regeneration stage to provide a co-current flow of the second gas and partially spent metal-sulfur compound in the second regeneration stage; (g) means to control the amount of oxygen in the second gas contacting the partially spent metal-sulfur compound and thereby generate gaseous sulfur compound and reusable metal oxide by the reaction between the second gas and the partially spent metal-sulfur compound in the second regeneration stage, the amount of oxygen in the second gas being sufficient for complete oxidation of the partially spent metal-sulfur compound; (h) a first gas outlet means for removing gas from the first regeneration stage, the first gas outlet means being located at a position in the regenerator upstream of the second gas inlet means, whereby gaseous sulfur formed in the first regeneration stage is removed from the regenerator; (i) a third gas inlet means for passing a gas containing oxygen into the third stage for cooling and purging reusable metal oxide therein, the gas containing oxygen being added to the third stage to provide a flow of gas containing oxygen in a direction countercurrent to the direction of the moving bed of reusable metal oxide; (j) a second gas outlet means for removing from the regenerator, gas from the second gas inlet gas from the third gas inlet and the balance of gas remaining in the apparatus from the first gas inlet after removal of gas from the first gas outlet; (k) means for diverting gas removed from the second gas outlet to the first gas inlet and the second gas inlet; and (l) means for removing reusable metal oxide from the regenerator.

In preferred embodiments of the present invention, the first gas used in the first regeneration stage and the second gas used in the second regeneration stage are comprised of gaseous sulfur compound from the regenerator, that is, the first gas and second gas are primarily recycled gaseous sulfur compound. The oxygen concentration of the first gas and the second gas is controlled with oxygen-containing gas obtained from any conventional source, for example, an air compressor. The gaseous sulfur compound from the regenerator generally contains sulfur dioxide, and, as discussed above, a high sulfur dioxide concentration and a low oxygen concentration in the first gas inlet improves the yield of elemental sulfur in accordance with the present invention.

The process and apparatus for the removal of gaseous sulfur compounds from hot gases containing gaseous sulfur compounds by using metal oxides in an absorber are conventional and well-known in the art, for example, in U.S. Pat. No. 4,857,285.

In the regeneration process and apparatus of the present invention wherein elemental sulfur is generated and removed from the process and from the apparatus, the temperature of the highly exothermic regeneration reaction is controlled by controlling the amount of oxygen which is generally air, oxygen-enriched air, or in certain embodiments, pure oxygen, in the off-gas from the generator which is circulated or recycled to the first and second stages of the regenerator. The off-gas containing gaseous sulfur compound, for example sulfur dioxide, is cooled before it is recycled to the regenerator. The heat removed from the off-gas can be used to produce high temperature steam, thus turning the system into a useful heat producing process rather than a heat consuming process typical of many of the prior art systems and processes. Furthermore, by using the regeneration off-gas in the first regeneration stage and by controlling the amount of oxidizing gas, for example, air, oxygen-enriched air or pure oxygen, added thereto, increased recovery of elemental sulfur can be achieved by the process and apparatus of the present invention.

As used herein, spent sorbent and spent metal-sulfur compound are used interchangeably and are sulfur-rich compounds, and partially spent sorbent and partially spent metal-sulfur compound are used interchangeably and are compounds which have been partly regenerated and still contain sulfur.

Other advantages of the process and the apparatus of the present invention will be apparent from the accompanying drawings and the following detailed description of the invention.

DETAILED DESCRIPTION OF THE INVENTION

Figure 1:
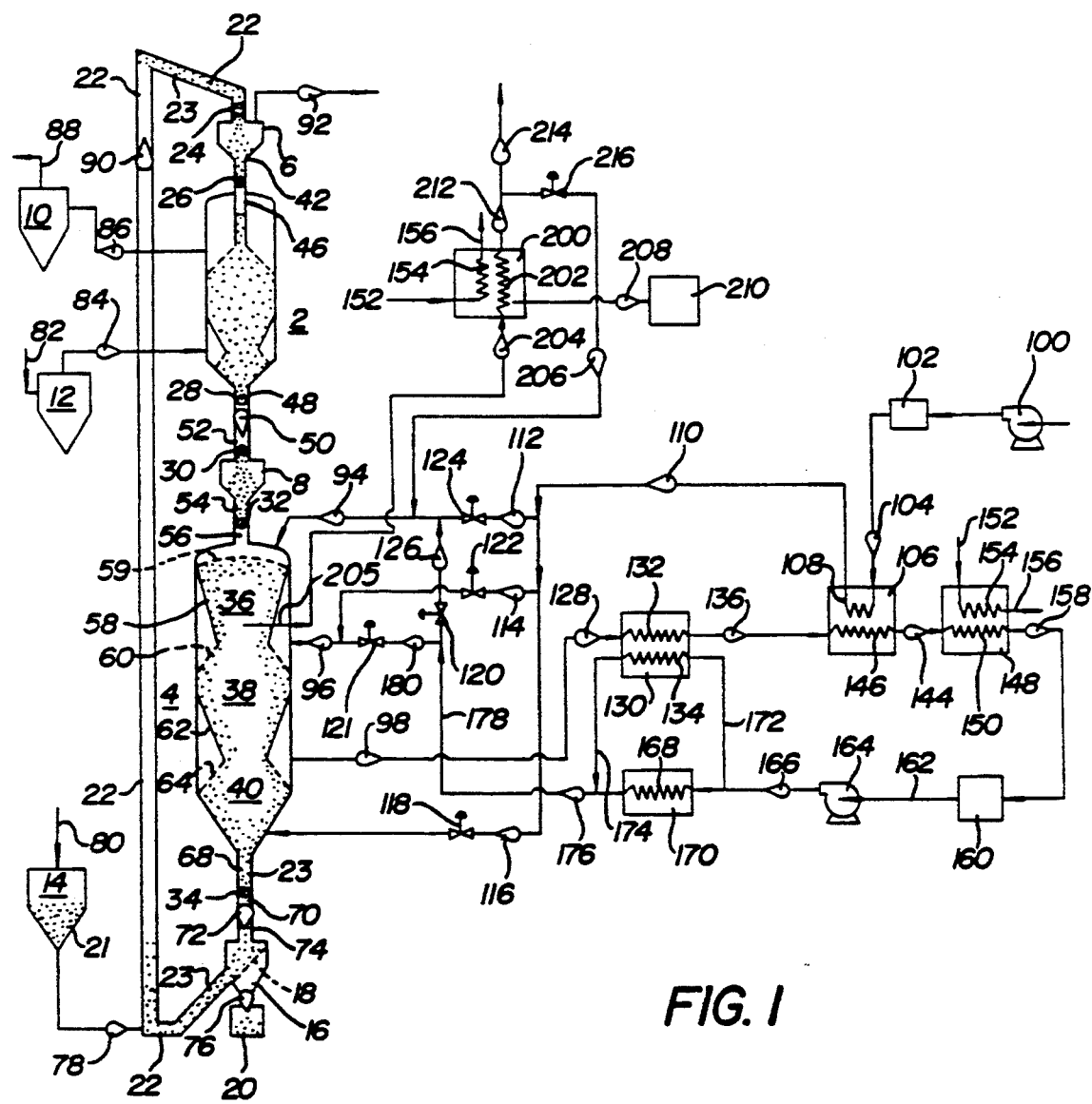
FIG. 1 represents a cross-sectional diagrammatic representation of the apparatus of the present invention.

The metal which is combined with the spent metal-sulfur compound, that is, combined as a sulfide, or the metal in the re-usable metal oxide which is combined with the oxides in the present invention and which form the spent sorbents or re-usable sorbents of the present invention, are well-known in the art and include the transition metals, preferably, copper, zinc, iron, nickel, chromium, molybdenum, vanadium, tungsten or mixtures thereof. Other metals which may be combined as oxides or sulfides, and in the oxide or ferrite form in the spent or re-usable sorbents in the process and apparatus of the present invention, include the group IIA alkaline earth metals, including strontium, calcium and barium as taught in U.S. Pat. No. 4,442,078 which is incorporated herein by reference in its entirety. The preferred re-usable metal oxides or spent metal-sulfur or partially spent metal-sulfur compounds, i.e., the sorbent or spent sorbents, which may be used in the process and apparatus of the present invention, are the metal oxides selected from the group consisting of iron oxide, zinc oxide, zinc ferrite, copper ferrite, copper oxide; molybdenum oxide and vanadium oxide. As used herein, the terms, sorbent, spent sorbent, metal oxides, metal sulfide, partially spent metal-sulfur compound or metal-sulfur compound, also include mixtures of the foregoing, as well as other metal oxide compounds such as, copper aluminate, copper ferrite aluminate, copper molybdenum aluminate and the like.

In the prior art, the regeneration is carried out in the regenerator by contacting the spent sorbent, generally in the metal sulfide form, with air, oxygen-enriched air or pure oxygen, as shown in equation (I) above, and an exothermic reaction occurs, thereby increasing the risk of sintering of the sorbent material, such as the metal sulfide, partially spent metal-sulfur compound or regenerated metal oxide.

To minimize sintering and other thermal damage to the spent or partially spent metal-sulfur compound and re-usable metal oxide so that they can be reused over many (for example 100 or more) absorption/regeneration cycles, temperature control must be maintained throughout the regenerator reactor. In the present invention, temperature control is achieved through staged regeneration and by controlling the inlet gas temperature and the inlet oxygen concentration of the gas containing oxygen in each regeneration stage, as well as the sulfur dioxide concentration in the first and second regeneration stages as shown in equations (II), (III), (IV) and (V).

Oxidation reaction rate of spent metal-sulfur compound in the first regeneration stage is very high resulting in a high rate of heat generation and consequently, in a significant increase in gas temperature in the first regeneration stage, and furthermore, in a significant difference in temperature between the first regenerating gas containing oxygen (first gas) and the spent metal-sulfur compound. The temperature of the spent sorbent is higher than the temperature of the gas in the regenerator. To prevent sorbent sintering, it is critical to maintain a sufficiently low regenerator gas temperature (by controlling the sulfur dioxide and oxygen concentration in the gas-containing oxygen as discussed above) so that the spent metal-sulfur compound temperature remains below its sintering temperature. Typical oxygen concentration in the first gas in the first regeneration stage inlet is about 0 to 2 percent by volume, and the regenerator gas temperature is controlled at about 100°–200° C. below the sintering temperature of the sorbent. Oxidation reaction rate of the partially-sulfided sorbent in the second regeneration stage is lower resulting in a significant increase in regenerator gas temperature but in only a small temperature difference between the temperature of the second regenerating gas-containing oxygen and the partially spent sorbent. Typical oxygen concentration in the second gas of the second stage regeneration inlet is about 2 to 5 percent by volume, and the gas temperature in the second stage of the regenerator is controlled at about 50°–100° C. below the sintering temperature of the sorbent.

Concomitant with the control of the temperature of the spent or partially spent metal-sulfur compound undergoing regeneration is the control of the stoichiometry in the reactions in the first regeneration stage and the second regeneration stage. As indicated above, low oxygen concentration and high sulfur dioxide concentration in the first stage improve the yield of elemental sulfur. In the known prior art reactions for the regeneration of iron oxide from iron sulfide by sulfur dioxide containing a small amount of makeup oxygen (less than the stoichiometric amount of oxygen required for complete oxidation of the spent iron sulfide), the following equations (III), (IV) and (V) have been demonstrated:

$$2\ FeS + 10/3\ O_2 \rightarrow 2/3\ Fe_3O_4 + 2\ SO_2 \qquad (III)$$

$$3\ FeS + 2\ SO_2 \rightarrow Fe_3O_4 + 5/2\ S_2 \qquad (IV)$$

$$5\ FeS + 10/3\ O_2 \rightarrow 5/3\ Fe_3O_4 + 5/2\ S_2 \quad (V)$$

A concentration of oxygen less than the stoichiometric amount required for complete oxidation of the spent metal sulfur compound promotes the formation of gaseous sulfur. Accordingly, a low concentration of oxygen in the first gas containing sulfur dioxide not only reduces heat generation in the first regeneration stage but also promotes the formation of gaseous sulfur. It is for this reason that the total oxygen content of the first gas is 0% to about 2% by volume, more preferably, about 1% to about 2% by volume, in order to maintain oxidation of the spent metal-sulfur compound to sulfur. In certain instances, the total oxygen content of the first gas is 0% to promote the generation of sulfur while controlling the temperature of the exothermic reaction in the first regeneration stage. Thus, gas containing oxygen is added to the first gas to maintain the total oxygen content of the first gas at a concentration less than the stoichiometric amount required for complete oxidation of the spent metal sulfur compound to a metal oxide and sulfur dioxide, thereby promoting the formation of sulfur, but also at a concentration sufficient to control the temperature of the exothermic reaction in the regeneration stage.

In the second regeneration stage, the second gas contains oxygen at a concentration sufficient for complete oxidation of the partially spent metal sulfur compound. Thus, gas containing oxygen is added to the second gas, the total oxygen content of the second gas being maintained at a concentration sufficient for complete oxidation of the partially spent metal-sulfur compound as shown in equation (VI), while controlling the gas temperature in the regenerator so that it is maintained below the sintering temperature by controlling the temperature of the exothermic reaction in the second regeneration stage. As indicated above, the total oxygen content of the second gas is about 2% to about 5% by volume.

$$2MS + 3O_2 \rightarrow 2MO + 2SO_2 \qquad (VI)$$

The physical form, shape and size of the spent and re-usable sorbent used in the process and apparatus of the present invention are not critical as long as the sorbent has the regeneration characteristics described above, and as long as it can be moved or propelled continuously or intermittently through the system as a packed, non-fluidized bed. The preferred sorbent is in the form of pellets, however, granular, spherical, particulate and other geometrical forms can be used in the present process and apparatus. Typically, the sorbent particles should be of a size sufficiently large so that the particles are not entrained by the gas streams.

Although it is not a part of the present invention, typically a gas to be desulfurized is contacted counter-currently in an absorber in a continuous process through a packed, non-fluidized movable bed of sorbent operated in a continuous or intermittent mode, and the sorbent reacts with sulfur compounds forming sulfur-rich metal sorbents defined herein as spent sorbents, metal sulfides or spent metal-sulfur compounds. The sulfur-rich metal sorbent passes into the top of the regenerator into a first phase regeneration zone where a first gas derived from sulfur dioxide-containing off-gas recycled from the regenerator which promotes the formation of elemental sulfur while controlling the exothermic reaction in the first regeneration zone, moves co-currently in the direction in which the bed of spent sorbent moves. In this first phase regeneration zone, a part of the spent sorbent is converted to a partially-sulfided metal sorbent, also referred to herein as a partially spent metal-sulfur compound, and gaseous sulfur, that is, sulfur in the vapor phase.

The partially spent metal-sulfur compound formed in the first phase, moves into a second phase regeneration zone in the regenerator, typically located below the first phase regeneration zone of the regenerator, and a second gas derived from sulfur dioxide-containing off-gas from the regenerator and which generally contains excess oxygen, moves co-currently in the direction in which the bed of partially spent metal-sulfur compound moves. The second gas-containing oxygen converts substantially all of the remainder of the partially spent metal-sulfur compound, that is, the partially-sulfided metal sorbent, to re-usable metal oxide and gaseous sulfur compound. The gaseous sulfur compound is predominantly sulfur dioxide and generally contains a substantial amount of nitrogen.

The gaseous sulfur formed in the first regeneration stage is removed at a first gas outlet from the regenerator at a point prior to the introduction of the second gas into the second regeneration stage. In preferred embodiments, the gaseous sulfur is removed from the regenerator at the first regeneration stage, most preferably, at the location of the first regeneration stage proximal the second regeneration stage.

The sulfur which is formed in the first regeneration stage and removed therefrom, is in the vapor phase, i.e., gaseous sulfur, because it is at the temperature of the gas in the first regeneration stage. The gaseous sulfur is preferably passed to a sulfur condenser where it is cooled to about 250° to about 400° F. (121° C. to 204° C.) where it becomes liquefied. The liquefied sulfur may be further cooled to produce solid elemental sulfur, however, the sulfur is most easily handled and shipped in the liquefied state, and in preferred embodiments, it remains liquefied. The heat transferred from the gaseous sulfur in the sulfur condenser may be transferred to other elements in the apparatus or it may be converted to steam as discussed in more detail below. The gas remaining after the sulfur becomes liquefied may be recycled to the first gas stream discussed above, before or after the removal of inert gases, for example nitrogen, and/or excess gas, therefrom by a suitable vent or bleed.

The amount of gaseous sulfur and other gas which passes from the first regeneration stage and which is removed from the regenerator as elemental sulfur, depends upon the size of the gas outlet for removing gaseous sulfur therefrom. If the size of the gaseous sulfur outlet stream is equal to the size of the first gas stream, and there are no pressure restrictions, then the gaseous sulfur stream is approximately equal to the first gas stream, and substantially all of the gas in the first stage will exit from the regenerator in the gaseous sulfur stream, i.e., the first gas outlet. In certain instances, depending upon the oxygen concentration and the sulfur dioxide concentration of the first gas stream, and therefore, depending upon the stoichiometry of the reaction, gaseous sulfur compound, for example sulfur dioxide, will also be entrained within the stream with the gaseous sulfur. Likewise, in any gas which passes from the first regeneration stage to the second regeneration stage, gaseous sulfur compound as well as gaseous sulfur will also be entrained therewith, and the gaseous sulfur compound will be oxidized to sulfur dioxide by the oxygen in the second gas stream. If the size of the first gas inlet stream is greater than the gaseous sulfur stream, i.e., the first gas outlet stream, which removes gaseous sulfur from the regenerator, then gas, including gaseous sulfur compound will be retained in the first regeneration stage and will pass to the second regeneration stage along with the partially spent metal sulfur compound. This gas which passes from the first regeneration stage to the second regeneration stage, is defined herein as the balance of gas remaining from the first gas inlet after removal of gas from the first gas outlet.

After the partially spent metal-sulfur compound is subjected to the high oxygen concentration (excess oxygen) in the second gas stream in the second regeneration stage of the regenerator and is converted to re-usable metal oxide and sulfur dioxide, the re-usable metal oxide passes to a third zone in the regenerator where any residual sulfided metal sorbent or residual metal-sulfur compound remaining in the re-usable metal oxide is converted to re-usable metal oxide and sulfur dioxide, that is, to complete regeneration of the spent sorbent; where the re-usable metal oxide is cooled and where re-usable metal oxide is purged of sulfur dioxide-containing gas with air, oxygen-enriched air or pure oxygen, otherwise defined herein as a cooling and purging medium.

In the third stage or zone in the regenerator, typically located below the second regeneration stage, the regenerating, cooling and purging medium, preferably air, oxygen-enriched air or pure oxygen, is introduced into the bottom of the regenerator, that is, into the lower end of the third stage or zone, and passes upwardly, that is, countercurrently to the direction of the movement of the movable bed of regenerated metal oxide. In preferred embodiments of the present invention, all of the gases which enter the regenerator and all of the gases which are formed in the regenerator, with the exception of the gases which exit from the first gas outlet as described above, exit the regenerator at a point located at the lower end of the second regeneration stage and/or the upper end of the third stage, defined herein as the second gas outlet. Alternatively stated, the gases exit the regenerator in a second gas outlet at a suitable point in the regenerator where the co-current streams of gas from the second stage and the balance of any gas remaining from the first gas inlet after removal of gas from the first gas outlet meet the countercurrently-flowing gas from the third stage. This stream of gas is identified herein as the regenerator off-gas, as sulfur dioxide-containing gas purged from the regenerated metal oxide, recycle off-gas or gaseous sulfur compound removed from the regenerator. At least one gas outlet is provided for removing the recycle off-gas from the regenerator.

In the process and apparatus of the present invention, a first gas passes into the first regeneration stage and prior to the point at which a second gas passes into the second regeneration stage, a gas outlet is provided for removing gaseous sulfur formed in the first regeneration stage. Any gas present in the first regeneration stage which cannot exit the regenerator with the gaseous sulfur, is defined herein as the balance of gas remaining from the first gas inlet and is combined within the regenerator at the second regeneration stage with the second gas which is introduced into the second regeneration stage. These gases in turn are combined with a third gas, generally defined herein as a gas containing oxygen which passes into the third regeneration stage and passes in a direction countercurrent to the movement of the re-usable metal oxide in the third regeneration stage and thereafter combines with the gases from the second regeneration stage to pass from the regenerator preferably in a single second gas outlet.

The re-usable metal oxide is removed from the bottom of the regenerator and is re-used in an absorber for additional removal of sulfur-containing compounds from gases.

In order to provide the necessary temperature control, optimal oxygen concentration and optimal regenerator vessel size, it is critical in the process and apparatus of the present invention that the movable bed pass through a regenerator having three stages as discussed above, namely, a first regeneration stage, a second regeneration stage and a third regeneration, cooling and purging stage. The total volumetric flow of oxygen to the regenerator is slightly higher (typically by about 1 to 5 percent) than the volumetric flow of oxygen required for complete regeneration of the spent sorbent. The oxygen concentration of the oxygen-containing gas is the ratio of the total volumetric flow of oxygen to the total volumetric flow of the gas containing oxygen. As can be seen by one skilled in the art, low oxygen concentration in the gas containing oxygen requires high volumetric flow rate of the gas containing oxygen through the regenerator, thus resulting in an increased size of the regenerator vessel, an increased size of the gas handling equipment (such as pipes, valves, heat exchangers, compressors) and an increase in the power required to feed diluent into the regenerator. Staged regeneration of the present invention allows the optimization of oxygen concentration in the various oxygen-containing gas streams thus minimizing the cost of the regeneration system. That is, in the first stage regeneration, where the rate of oxidation reaction is the highest and temperature rises quickly, the oxygen is maintained at a low concentration, a concentration of oxygen less than the stoichiometric amount required for complete oxidation of the spent metal sulfide compound. This also promotes the generation of sulfur in the first regeneration stage. In the second stage regeneration, the rate of oxidation reaction is lower allowing the use of higher oxygen concentration in the oxygen-containing gas. In the third stage when oxidation is complete or almost complete, a stream containing very high oxygen concentration (as high as about 20 to 100%) can be used.

The amount of oxygen in the first gas containing oxygen which moves co-currently in the direction of the movable bed of the sorbent in the first phase regeneration, must be sufficient to convert a sulfur-rich sorbent (spent sorbent) to a partially-sulfided metal sorbent (partially spent metal-sulfur compound) and elemental sulfur. Naturally, other sulfur compounds, e.g., sulfur dioxide, will also be produced in the exothermic reaction. The amount of oxygen in the second oxygen-containing gas which moves co-currently in the direction of the movable bed or sorbent in the second phase regeneration, must be sufficient to complete or substantially complete the conversion of the remainder of the partially sulfided sorbent to the re-usable metal oxide form.

In the process and apparatus of the present invention, it is critical that the first gas-containing oxygen has a concentration of oxygen which is less than the stoichiometric concentration of oxygen required to convert completely the spent sorbent to re-usable metal oxide and sulfur as shown in equations (II), (III), (IV) and (V) above. Thus, there must be an insufficient amount of oxygen to convert the spent sorbent to metal oxide in the first stage of the regenerator so that elemental sulfur will be generated. For example, about 1/5 to about $\frac{1}{3}$ of the spent sorbent would be converted to re-usable metal oxide in the first stage. Correspondingly, in the second stage of the regenerator, there is at least a stoichiometric amount of oxygen to convert all of the remaining spent sorbent (partially spent metal-sulfur compound) to re-usable metal oxide and to release all of the sulfur compound absorbed on the metal compound to sulfur dioxide. For example, the remaining 4/5 to 2/3 of the spent sorbent would be converted to re-usable metal oxide in the second stage. However, as discussed above provision is made in the third stage of the regenerator to convert any spent sorbent remaining from the first and second stages or zones to re-usable metal oxide.

In accordance with preferred embodiments of the present invention, the oxygen concentration in both the first gas introduced into the first regeneration stage and the second gas containing oxygen introduced into the second stage regeneration is controlled by introducing oxygen-containing gas, such as air, oxygen-enriched air or pure oxygen, into the recycled off-gas which contains sulfur dioxide purged from the regenerator. The oxygen-containing gas is a diluent of the purged off-gas containing sulfur dioxide derived from the combined gases of the first, second and third stages of the regenerator. Thus, when the first gas and second gas introduced into the respective regeneration stages is the off-gas containing sulfur dioxide purged from the regenerator, the diluent is oxygen-containing gas, and it is introduced into the off-gas to provide the desired concentration of oxygen, if any, for the respective regeneration stages. The volume flow ratio is selectively maintained between the source of oxygen-containing gas acting as a diluent and the sulfur dioxide-containing gas purged from the regenerator to provide a sufficient amount of oxygen in the first gas to maintain the temperature of the exothermic reaction in the first phase regeneration, specifically the temperature of the spent sorbent, which is higher than the temperature of the gas, below the sintering temperature of the sorbent, for example, to maintain the maximum temperature of the gas in the first phase regeneration at about 700° C. when sintering temperature of the spent sorbent is about 850° C., while simultaneously maintaining less than the stoichiometric amount of oxygen required for complete oxidation of the spent sorbent.

In certain preferred embodiments, the oxygen concentration in the first gas is 0% to about 2% (by volume), and more preferably about 1% to 2% (by volume) of the sulfur dioxide-containing off-gas. Furthermore, the volume flow ratio is selectively maintained between the source of oxygen-containing gas and the sulfur dioxide-containing off-gas purged from the regenerated metal oxide to provide a sufficient amount of oxygen in the second gas to maintain the temperature of the exothermic reaction in the second stage regeneration below the sintering temperature of the sorbent, for example, to maintain the maximum temperature of the gas in the second stage regeneration at about 800° C. when the sintering temperature of the sorbent is about 850° C. In certain preferred embodiments of the present invention, the oxygen concentration in the second stage is maintained at about 2% to about 5% or higher (by volume) with the sulfur dioxide-containing off-gas.

Generally, the sulfur dioxide-containing off-gas purged from the regenerator must be cooled by any suitable means so that the temperature of the first gas stream and the second gas stream is about 600° F. (315° C.) to about 1200° F. (649° C.). As explained above, the sulfur dioxide-containing gas purged from the regenerated metal oxide is a mixture of the sulfur dioxide-containing gas from the first and second stages of the regenerator, and the air, oxygen-enriched air or pure oxygen used to cool the regenerated metal oxide, to complete regeneration and to purge regenerated metal oxide of sulfur dioxide-containing gas, which typically has a temperature of about 1000° F. (537° C.) to about 1500° F. (815° C.).

In accordance with the present invention, the off-gas containing sulfur dioxide purged from the regenerator typically contains about 10% to about 13% (by volume) sulfur dioxide when air is used as the source of oxygen-containing gas. Thus, it also contains nitrogen because a substantial amount of air is nitrogen. When oxygen-enriched air is used, it typically has about 40% by volume oxygen and 60% by volume nitrogen. When pure oxygen is used as the source of oxygen-containing gas, the regenerator contains up to about 100% sulfur dioxide. Thus, by increasing the amount of oxygen in the oxygen-containing gas, increases the amount of sulfur dioxide purged from the regenerator.

Any means may be provided for feeding spent sorbent through the apparatus and from an absorber to the regenerator and from the regenerator to an absorber so that there is a completely cyclical process and apparatus and so that the sorbent may be moved intermittently or continuously throughout the system. The means for moving the beds of sorbent throughout the regenerator are not critical, and in preferred embodiments the beds of sorbents are moved by gravity. However pressure means, such as air pressure, pneumatic devices, elevators, screws, rotary valves and various other mechanical means may be used to propel continuously or intermittently, the beds of sorbent throughout the system, for example, as described in U.S. Pat. No. 2,551,905 and U.S. Pat. No. 4,857,285 both of which are incorporated by reference herein in their entirety.

A first gas inlet means is provided for adding a first gas into the first regeneration stage so that the gas can contact the spent sorbent and generate elemental sulfur and to regenerate at least part of the spent metal-sulfur compound, the first gas being added to the first regeneration stage to provide a co-current flow of gas and spent metal-sulfur compound, the first gas containing sulfur dioxide and only an amount of oxygen to maintain a stoichiometric amount of oxygen so that there is incomplete oxidation of the spent metal-sulfur compound (spent sorbent) and the generation of elemental sulfur. Means, such as metering means, are provided to control the amount and concentration of oxygen in the first gas contacting the spent-metal sulfur compound and thereby generate gaseous sulfur and partially spent metal-sulfur compound in the reaction between the first gas and the spent-metal sulfur compound in the first regeneration stage and thereby control heat generated by reaction between the oxygen and the spent sorbent in the first regeneration stage.

A second gas inlet means is provided for adding a second gas to the second regeneration stage to contact the partially spent metal-sulfur compound and thereby form a bed of re-usable metal oxide, the second gas being added to the second regeneration stage to provide a co-current flow of the second gas and partially spent metal-sulfur compound in the second regeneration stage. Means, such as metering means, are provided to control the amount of oxygen in the second gas contacting the partially spent metal-sulfur compound and thereby generate gaseous sulfur compound and re-usable metal oxide by the reaction between the second gas and the partially spent metal-sulfur compound in the second regeneration stage, the amount of oxygen in the second gas being sufficient for complete oxidation of the partially spent metal sulfur compound and for control of the heat generated by reaction between the oxygen and the spent sorbent in the second regeneration stage.

A first gas outlet means is provided for removing gas from the regenerator at a position in the regenerator upstream (of the gas flow) of the second gas inlet means. The first gas outlet means provides a gas outlet for gaseous sulfur formed in the first regeneration stage. The first gas outlet means is preferably located at the portion of the first regeneration stage proximal the second regeneration stage.

A third gas inlet means is provided for passing a gas containing oxygen into the third regeneration stage for cooling and purging re-usable metal oxide therein, the gas-containing oxygen being added to the third stage to provide a flow of gas-containing oxygen in a direction countercurrent to the direction of the moving bed of re-usable metal oxide. Although only one gas inlet is preferred for each stage, it is possible to provide a plurality of gas inlets in the system of the present invention.

The apparatus of the present invention has a second gas outlet means for removing from the regenerator, the combined gases from the first and second gas inlets which flow in a direction co-current with the moving bed in the first and second regeneration stages, and the gas from the third gas inlet which gas flows in a direction countercurrent to the moving bed in the third stage, the gas from the first gas inlet being only that amount of gas (the balance) which proceeds to the second regeneration stage after gas in the first regeneration stage exits the apparatus by the first gas outlet means.

Lock hoppers may be provided in the apparatus for feeding a controlled amount of sorbent into the top of the regenerator and for receiving a controlled amount of sorbent from the bottom of the regenerator. In preferred embodiments, the lock hoppers are pressurized and depressurized as required, and the sorbent is moved intermittently throughout the system using the lock hoppers. A plurality of lock hoppers can be used to provide a continuous flow of sorbent when used in conjunction with a rotary valve which controls and meters the movement of the movable beds.

Either manually-controlled valves or automatically-controlled valves can be used for introducing the gases into the respective gas inlets of the regenerator and for metering the diluents into the respective gas streams and gas inlets. One skilled in the art can determine the optimal amounts of gas and the optimal rate at which the sorbents move throughout the system in order to achieve maximum generation of elemental sulfur and the most efficient regeneration of re-usable metal oxide from spent metal sulfide sorbents.

Compressors and suitable conduits connecting the compressors to the gas inlets of the regenerator can be used by one skilled in the art. Any suitable oxygen supply can be used for those embodiments where air, pure oxygen or oxygen-enriched air are used. Suitable compressors can be provided for pressurizing the sulfur dioxide-containing off-gas from the regenerator and recycling it to the first gas inlet means and second gas inlet means. Suitable heat transfer means can be used for removing heat from the off-gas removed from the gas outlet of the regenerator.

FIG. 1 shows the apparatus of the present invention adapted to the system for removal of sulfur compounds from gases and for regenerating spent sorbents described in U.S. Pat. No. 4,857,285 where sorbent moves intermittently through lock hopper 6, absorber 2, lock hopper 8, regenerator 4, screening device 18 and sorbent conduit 22. Absorber 2 is under a pressure of about 10 to 40 atmospheres. Regenerator 4 is under a pressure of about 1 to 40 atmospheres. Sorbent conduit 22 is typically operated at atmospheric pressure, and lock hoppers 6 and 8 alternate at different pressures. Valves 24, 26, 30 and 32 are ball valves and are designed to withstand high pressure and temperature and to prevent gas leakage from a high pressure vessel into a vessel under lower pressure or into the atmosphere.

Stream 90 of regenerated sorbent 23 in sorbent conduit 22 is introduced through lock hopper 6 to the top of absorber 2 by gravity. Stream 90 may be any suitable system for propelling regenerated sorbent 23 from the bottom of regenerator 4 through sorbent conduit 22 to the top of absorber 2, or alternatively, to the top of lock hopper 6.

Fresh makeup sorbent 21 from a suitable source as shown by arrow 80, when required, is added to conduit 22 by stream 78 from makeup silo 14. The amount of sorbent 23 which is elevated and moves into lock hopper 6 is controlled by rotary valve 34. Sorbent 23 in conduit 22 is under atmospheric pressure, and it moves through open valve 24 to lock hopper 6 which is vented with slip stream 92. Valve 26 opens when the pressure in lock hopper 6 is equal to the pressure in absorber 2. Sorbent moves from lock hopper 6 through conduit 42 into conduit 46 into absorber 2 by gravity. Concurrently, while conduit 54 is closed by valve 32, sulfided sorbent moves by the action of rotary valve 28 through conduit 48 through open valve 30 and into lock hopper 8 which is initially empty. By the time lock hopper 6 is empty, lock hopper 8 contains the same amount of sorbent that was initially in lock hopper 6, and lock hopper 6 is readied for a second batch of regenerated sorbent.

In absorber 2, the sorbent reacts with a stream of hot coal-derived fuel gas 84. The hot gas stream 84 enters and is uniformly distributed in absorber 2, and moves in a direction countercurrent to the direction of movement of sorbent in absorber 2.

A stream of hot fuel gas 82 from any source, such as a coal gasification plant (not shown) passes into primary particulate collector, such as cyclone 12, for the removal of particulate matter and thereafter passes by stream 84 into absorber 2. The desulfurized gas stream passes from the top of absorber 2, that is, from the area of the absorber where the upper-most part of the bed of sorbent is located, through stream 86 into a secondary particulate collector, such as cyclone 10, for removing particulate matter through suitable conduit 88 for utilization in any suitable system, such as a power plant.

In absorber 2, the sorbent becomes spent or exhausted, that is, it becomes rich in sulfur, and passes through rotary valve 28 into conduit 48/52 by means of stream 50, through valve 30, typically a ball valve, and thereafter into lock hopper 8.

From lock hopper 8 the spent sorbent passes through conduit 54 by gravity through open valve 32 into regenerator 4. The control of the movement of the spent sorbent from lock hopper 8 through conduits 54 and 56 is by rotary valve 34 at the bottom of regenerator 4. The action of rotary valve 34 moves the bed from the lock hopper 8 to the top of regenerator 4. At the same time regenerated sorbent discharges from the third stage of regeneration. Fines are separated by screen 18, and regenerated sorbent 23 moves into conduit 22.

Figure 2:
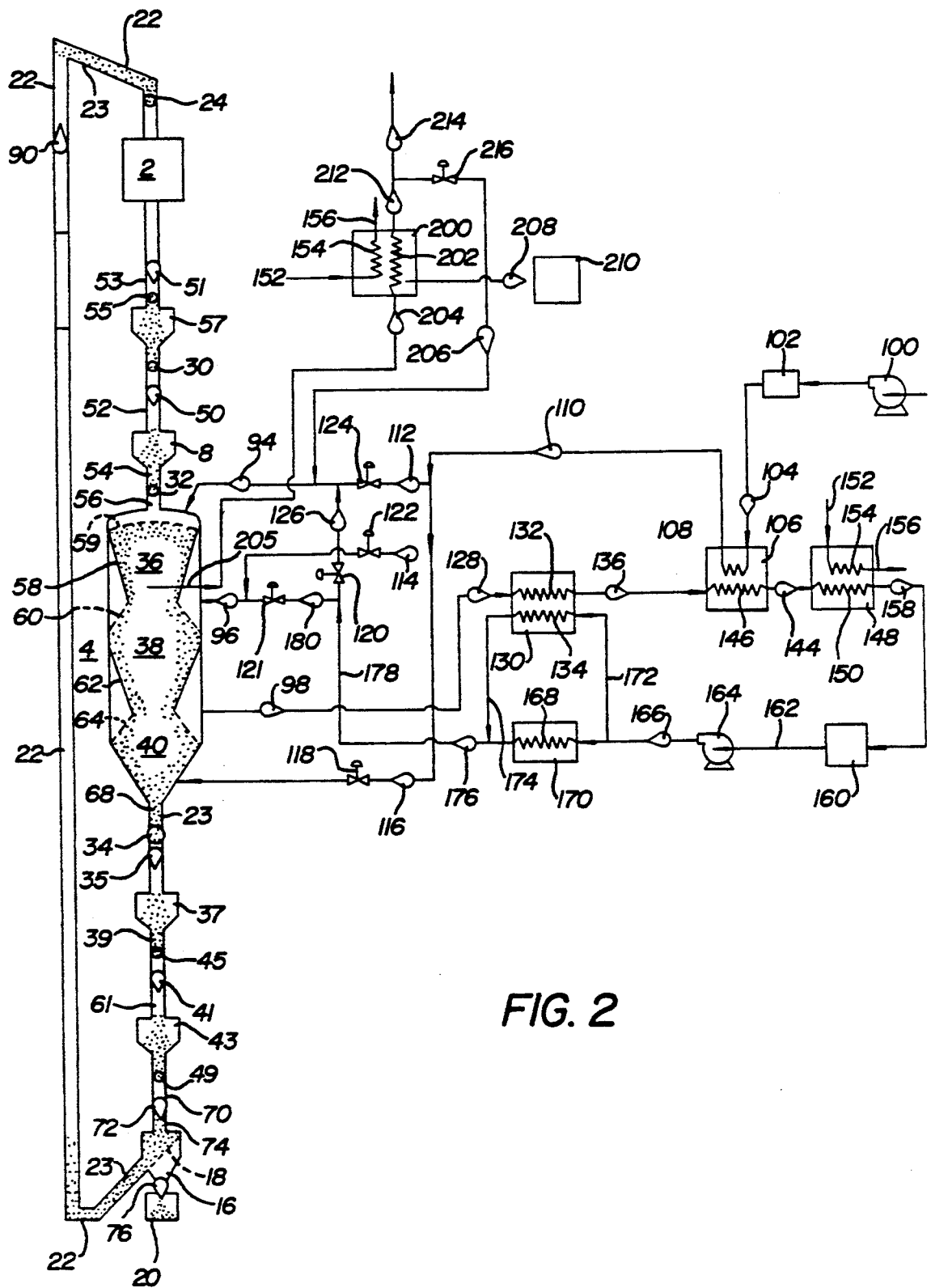
FIG. 2 represents a cross-sectional diagrammatic representation of an alternative apparatus of the present invention.

Regenerator 4 has three zones therein shown as zone 36, zone 38 and zone 40. As shown in FIGS. 1 and 2, regenerator 4 is approximately equally divided into the three zones, however, the size of each of the respective zones may vary according to the particular process and the desired reaction or activity carried out in each of the zones as explained above.

Zone 36 in regenerator 4 is the first phase regeneration stage, and the spent sorbent which enters absorber 4 from lock hopper 8 reacts with a stream 94 of recycled off-gas stream 126 diluted with air stream 112 which passes through valve 124 and optionally, residual gas stream 206. Gas from stream 94 enters the top of the regenerator, such as at the top of zone 36, through a suitable gas manifold 59 and passes in a direction which is co-current with the direction of movement of the sorbent being regenerated. In first phase regeneration zone 36, the spent sorbent becomes a partially reacted (sulfided) sorbent 58. In zone 36, part of the sorbent is converted to metal oxide sorbent, and the remainder is spent sorbent, thereby forming a partially-sulfided sorbent or partially spent metal-sulfur compound. During this regeneration in zone 36, under the stoichiometric conditions described above elemental sulfur is formed along with sulfur dioxide. In accordance with the present invention, the elemental sulfur formed in zone 36 is removed from the regenerator by means of a suitable gas outlet 205 before the elemental sulfur passes to zone 38 in the regenerator where additional oxygen would cause the elemental sulfur to convert to other sulfur compounds such as sulfur dioxide.

The elemental sulfur is formed in the vapor phase (gaseous sulfur) in stage 36 (because of the high temperature of the gases and the exothermic reaction therein). The gaseous sulfur is extracted from regenerator 4 by first gas outlet stream 204 through suitable conduits from first gas outlet 205. Any conventional gas collector (not shown) can be used in regenerator 4 to collect and remove the gaseous sulfur from first gas outlet 205. The gaseous sulfur must be removed from regenerator 4 before it is oxidized, for example to sulfur dioxide, in a subsequent zone where excess oxygen is available for oxidation. Thus, it is preferred that the gaseous elemental sulfur be removed from regenerator 4 before it reaches second gas inlet stream 96. In most preferred embodiments elemental sulfur is removed from regenerator 4 at the lower portion or bottom of regeneration stage 36.

Gaseous sulfur stream 204 is cooled in sulfur condenser 200 to a temperature wherein the gaseous sulfur becomes liquid, typically about 250° F. (121° C.) to about 400° F. (204° C.) in heat exchange coils 202. Liquefied sulfur is separated from the other gases in stream 204, e.g., nitrogen and sulfur dioxide, identified herein as residual gas. The residual gas is removed from sulfur condenser 200 in residual gas stream 212 where it passes through valve 216 to residual gas stream 206 and is recycled to first gas stream 94. Bleed stream 214 may be used as desired to remove inert gas species, e.g., nitrogen, and/or excess gas from the gas stream. The liquefied elemental sulfur can be removed from sulfur condenser 200 by stream 208 and held in storage tank 210. Storage tank 210 may also be a heated tanker which maintains the elemental sulfur in liquid form for shipment.

As the sorbent progressively moves through regenerator 4, it moves from zone 36 into zone 38 where a second stream 96 of recycled off-gas stream 180 is diluted with air stream 114. The second stream 96 of recycled off-gas diluted with air enters regenerator 4 at the top of zone 38 by an appropriate gas manifold 60 (second gas inlet) which uniformly distributes the gas into the top of zone 38. In zone 38, the stream 96 passes in the direction of movement of the sorbent in a co-current direction, the movement of the sorbent being from conduit 56 in the direction of conduit 68 in regenerator 4. In zone 38, the excess oxygen in the air present in an amount which is sufficient for complete oxidation of the partially spent metal-sulfur compound, reacts with the spent sorbent so that regenerated sorbent 62 forms therein and passes to zone 40 in absorber 4. In zone 38, the remainder of the spent sorbent is converted to re-usable metal oxide sorbent. Sorbent discharges from zone 38 at a controlled high temperature, e.g. about 800° C., which is sufficient for complete decomposition of all sulfates, such as zinc sulfate.

A third gas stream of air 116 passes into the bottom of absorber 4, that is, into the bottom of zone 40 through valve 118, in the region of conduit 68 where sorbent passes from absorber 4, and cools the regenerated sorbent and purges the gases, such as sulfur dioxide gas, from the regenerated sorbent. Air stream 116 also ensures a completion of the oxidation reaction, which, in all cases will be minimal in zone 40. Regenerated sorbent passes from regenerator 4 through conduit 68 and conduit 70 by stream 72. The movement of the bed from absorber 4 is controlled by rotary valve 34. As sorbent stream 72 passes through conduits 70/74 from regenerator 4, it is classified in classifier 16 to remove finely-divided sorbent, for example, dust, through stream 76 into storage area 20. A suitable screen 18 of appropriate mesh size can be used in classifier 16 to separate the fines from the re-usable or regenerated sorbent.

Air stream 116 as it flows through valve 118 into the bottom of zone 40 in regenerator 4 passes in a direction countercurrent to the direction of the movement of the sorbent in absorber 4. Thus, air stream 116 passes from the bottom of absorber 4 toward the top of absorber 4 until it meets the gases flowing from streams 94 and 96, at which point the gases exit through gas manifold 64 to a second gas outlet, off-gas stream 98. The second gas outlet (off-gas stream 98) is generally located between the bottom of zone 38 and the top of zone 40 to collect, with the exception of gas emerging through gas stream 204 at first gas outlet 205, the merging gas streams from absorber 4.

In the embodiment shown in FIGS. 1 and 2 the regeneration reaction in zones 36 and 38 in regenerator 4 is very exothermic and is accomplished in regenerator 4 in two stages wherein two stream of gas containing oxygen, i.e. a first gas and a second gas pass in a direction co-current with the direction of flow of the sorbent in regenerator 4. The oxygen concentration in streams 94 and 96 is controlled so that the temperature of the sorbents in regenerator 4 does not exceed the allowable level above which sintering of the sorbent occurs and so that elemental sulfur will form in zone 36. The oxygen concentration in stream 94 is lower than the oxygen concentration in stream 96 since the oxygen in stream 94 reacts with a more highly sulfided sorbent while stream 96 reacts with a partially-reacted to partially-regenerated sorbent. The reaction rate in the second regeneration zone 38 is slower, and therefore, the oxygen concentration in second gas containing oxygen stream 96 can be higher than the oxygen concentration in first gas containing oxygen, stream 94. The regeneration in zone 38 occurs with a slight stoichiometric excess of oxygen to insure complete regeneration of the sorbent while the regeneration in zone 36 occurs with less than the stoichiometric amount of oxygen to insure optimal generation of elemental sulfur.

The sorbent and the gas move from the second phase regeneration zone 38 at a temperature above which any sulfates formed during the reactions are not stable, that is, at about 700° C. and above. The hot sorbent as it passes from zone 38 is cooled in zone 40 of regenerator 4 to a temperature which will not be detrimental to rotary valve 34, by air stream 116.

The second gas outlet, gas stream 98, generally defined herein as off-gas or recycle gas, is a mixture of the gas of streams 94 (after gaseous elemental sulfur has been removed at first gas-outlet 205 in gas stream 204), 96 and 116 after the regeneration reaction has occurred in absorber 4. Off-gas stream 98 is hot and generally has a temperature of about 500° C. to 825° C. or higher, depending on the reaction conditions, the sorbent being-regenerated and other conditions within the system. Off-gas stream 98 is low in oxygen (about 0.5 to about 2 percent by volume) and rich in sulfur dioxide (about 10 to about 13 percent when air is used as the source of oxygen and higher if oxygen-enriched air is used up to about 100% if pure oxygen is used). Generally, the balance of off-gas stream 98 is nitrogen.

Dry compressed air (or alternatively, oxygen-enriched air or pure oxygen) stream 104 is the source of oxygen for the regeneration in the system shown in FIGS. 1 and 2. The air from compressor 100 after it passes through a gas dryer 102 in stream 104 is heated in coil 108 from stream 136 passing through coil 146 in heat exchanger 106 to approximately 400° C. at exchanger unit 106. Air stream 110 heated at about 300° C. is then split into air streams 112, 114 and 116. The volume flow ratio between air stream 112 which passes through valve 124, recycle off-gas stream 126 which passes through valve 120 and residual gas stream 206 determines the oxygen concentration of stream 94. The particular oxygen concentration of stream 94 is determined by the desired temperature in regeneration zone 36, but must be maintained so there is less than a stoichiometric amount of oxygen required for complete oxidation of the spent metal sulfide compound, i.e., so there will be optimal generation of elemental sulfur. The volume flow ratio between air stream 114 which passes through valve 122 and recycle off-gas stream 180 which passes through valve 121 determines the oxygen concentration of stream 96 where the oxygen concentration is determined by the desired temperature in second phase regeneration zone 38 of regenerator 4 and sufficient for complete oxidation of the partially spent metal-sulfur compound.

Heat exchangers 130, 106 and 148 are designed to recover the heat of regeneration by passing stream 128 into heat exchange coil 132 in heat exchanger 130 to stream 136, and into heat exchange coil 146 in heat exchanger 106 to stream 144 and thereafter into heat exchange coil 150 in heat exchanger 148. Various heat recovery systems and processes may be used in the present invention, and the heat recovery system shown in FIGS. 1 and 2 is for exemplary purposes only.

Off-gas recycle compressor 164 operates at a low inlet temperature of about 90° C. to reduce power consumption. As seen in the drawings recycle gas stream 158 passes from heat exchanger (boiler) 148 where the gas stream has been cooled in heat exchange coil 150 to the desired temperature. A stream of water 152 passes through the coil 154 in heat exchanger 148 and passes from the boiler of heat exchanger 148 in the form of a stream 156 of steam. The same stream of water 152 can pass through coil 154 in sulfur condenser 200 to utilize heat extracted from coil 202 where gaseous sulfur condenses to liquid sulfur.

Recycle gas stream 158 passes through a suitable filter 160 through conduit 162 into recycle compressor 164 where a discharge recycle gas stream 166 passes to heat exchanger 130 through conduit 172 where the stream is heated in heating coil 134 to about 400° C. to about 500° C. by the heat removed from hot stream 128 in heat exchange coil 132, which stream originates from the stream of regenerator off-gas 98 at a temperature generally in excess of 700° C. (usually above about 500° C. and below about 825° C.). The resultant stream 176 passes from heat exchanger 130 through conduit 174 and is recycled back to the regenerator 4 through conduit 178 and is split into gas streams 180 and 126 to be used as recycle gas for gas streams 94 and 96. Start-up heater 170 may be used to re-heat gas stream 166 in heating coil 168 initially or to supplement the heat contributed by heat exchanger 130.

Referring to FIG. 2, the general scheme and numerals remain identical to those shown for FIG. 1 above, and several elements of absorber 2 have been omitted to show means for continuously moving sorbent through regenerator 4. In FIG. 2, rotary feeder 34 runs continuously thereby feeding re-usable metal oxide from regenerator 4 to lock hopper 37 while spent sorbent continuously moves from lock hopper 8 through conduits 54/56 and open valve 32 to regenerator 4. The supply of spent sorbent can be replenished in lock hopper 8 from lock hopper 57 through open valve 30, stream 50 and conduit 52. Lock hopper 37 feeds into lock hopper 43 through stream 41, conduits 39/61 and open valve 45, and lock hopper 43 continuously feeds re-usable metal oxide by stream 72 through conduits 70/74 and open valve 49 to screen separator 18.

By the process and apparatus of the present invention, the off-gas from regenerator 4 which is rich in sulfur dioxide and which is derived from streams 116, 96 and in certain instances part of 94, after it is cooled, is returned to the process and ultimately further promotes the generation of elemental sulfur in zone 36 of regenerator 4. The concentration of oxygen, either oxygen added thereto or oxygen inherently entrained in the off-gas, in the off-gas supply to the first and second stages of the regenerator, respectively through a first gas and a second gas, not only controls the temperature in the respective movable beds in the regenerator, but also controls the generation of elemental sulfur in the first regeneration stage and the regeneration of re-usable metal oxide in the second regeneration stage. If the temperature of a particular bed in the regenerator becomes too high, for example, approaches the sintering temperature of the sorbent therein, the oxygen concentration is decreased by decreasing the flow of oxygen into the off-gas recycle stream which is recycled to the first gas inlet and/or the second gas inlet, and if the temperature of a particular sorbent bed in the regenerator becomes too low, for example, the regeneration of the spent sorbent is insufficient or incomplete therein, the flow of air, oxygen-enriched air or oxygen is increased to increase the oxygen concentration in the off-gas stream recycled to the first and/or second gas inlet streams. These adjustments in oxygen concentration can be made by monitoring temperatures in the regenerator. Furthermore, adjustments in oxygen concentration in the first gas which controls the generation of elemental sulfur, can be made by monitoring the sulfur production in the stream of gaseous sulfur which exits regenerator 4 in first gas outlet stream 204.

While other modifications of the invention and variations thereof which may be employed within the scope of the invention, have not been described, the invention is intended to include such modifications as may be embraced within the following claims.

What is claimed is:

1. An apparatus for generating elemental sulfur and re-usable metal oxide from a spent metal-sulfur compound comprising:

(a) a spent metal-sulfur compound regenerator having in a single vessel, means defining a first regeneration stage, a second regeneration stage and a third stage which has cooling and purging means;

(b) spent metal-sulfur compound feeder means to move spent metal-sulfur compound into said first regeneration stage of said regenerator;

(c) spent metal-sulfur compound feeder means to move spent metal-sulfur compound from said first regeneration stage to said second regeneration stage and from said second regeneration stage to said third stage having cooling and purging means;

(d) a first gas inlet means for introducing a first gas comprising sulfur and oxygen in said first regeneration stage in a co-current flow direction with the spent metal-sulfur compound in said first regeneration stage;

(e) oxygen control means in the first gas inlet means to maintain an amount of oxygen in the first gas at less than the stoichiometric amount required for complete oxidation of spent metal-sulfur compound in said first regeneration stage;

(f) a second gas inlet means for introducing a second gas containing oxygen in said second regeneration stage in a co-current flow direction with the spent metal-sulfur compound in said second regeneration stage;

(g) oxygen control means in the second gas inlet means to maintain an amount of oxygen in the second gas for complete oxidation of spent metal-sulfur compound in said second regeneration stage;

(h) a first gas outlet means as a gaseous sulfur removal means located at a position in the regenerator upstream of the second gas inlet means;

(i) a third gas inlet means for introducing a third gas containing oxygen in said third stage having cooling and purging means in a countercurrent flow direction with the direction of motion of a bed of re-usable metal oxide in said third stage;

(j) a second gas outlet means located between a bottom of said second regeneration stage and a top of said third stage for removing gas from the regenerator, gas from the second gas inlet means, gas from the third gas inlet means and the balance of gas remaining from the first gas inlet means after removal of gas from the first gas outlet means;

(k) means for diverting gas from the second gas outlet means to the first gas inlet means and the second gas inlet means; and (l) re-usable metal oxide removal means from said third stage of said regenerator.

2. The apparatus of claim 1 wherein said spent metal-sulfur compound feeder means is an intermittent feeder means.

3. The apparatus of claim 1 wherein said spent metal-sulfur compound feeder means is a continuous feeder means.

4. The apparatus of claim 1 further comprising heat transfer gas cooling means for cooling a gas stream from the first gas outlet means.

5. The apparatus of claim 4 further comprising recycle means for cooled gas to the first gas inlet means.

6. The apparatus of claim 4 wherein gaseous sulfur is cooled to liquefied elemental sulfur in said cooling means for cooling a gas stream and further comprising tank means to collect said liquefied elemental sulfur from said cooling means for cooling a gas stream.

7. The apparatus of claim 6 wherein said liquefied elemental sulfur is further cooled in said cooling means for cooling a gas stream to form solid elemental sulfur.

8. The apparatus of claim 4 further comprising cooled gas bleed means in said gas stream.

9. The apparatus of claim 1 further comprising a means defining a source of oxygen and conduits connecting the source of oxygen to the first gas inlet means of the first regeneration stage, to the second gas inlet means of the second regeneration stage and to the third gas inlet means of the third stage.

10. The apparatus of claim 9, wherein the means for providing the source of oxygen is an air compressor.

11. The apparatus of claim 9 further comprising oxygen volume flow control means to the first gas inlet means in said first regeneration stage and to the second gas inlet means in said second regeneration stage.

12. The apparatus of claim 1 further comprising an air compressor and conduits connecting the air compressor to the first gas inlet means of the first regeneration stage, to the second gas inlet means of the second regeneration stage and to the third gas inlet means of the third stage.

13. The apparatus of claim 1 further comprising heat removal transfer means for removing heat from a gas stream from the second gas outlet means.

14. The apparatus of claim 1 wherein the first gas outlet means is in the first regeneration stage.

* * * * *